March 17, 1970    B. B. BEEKEN    3,500,952
ACOUSTICAL SENSING DEVICE
Filed Dec. 20, 1967    2 Sheets-Sheet 1
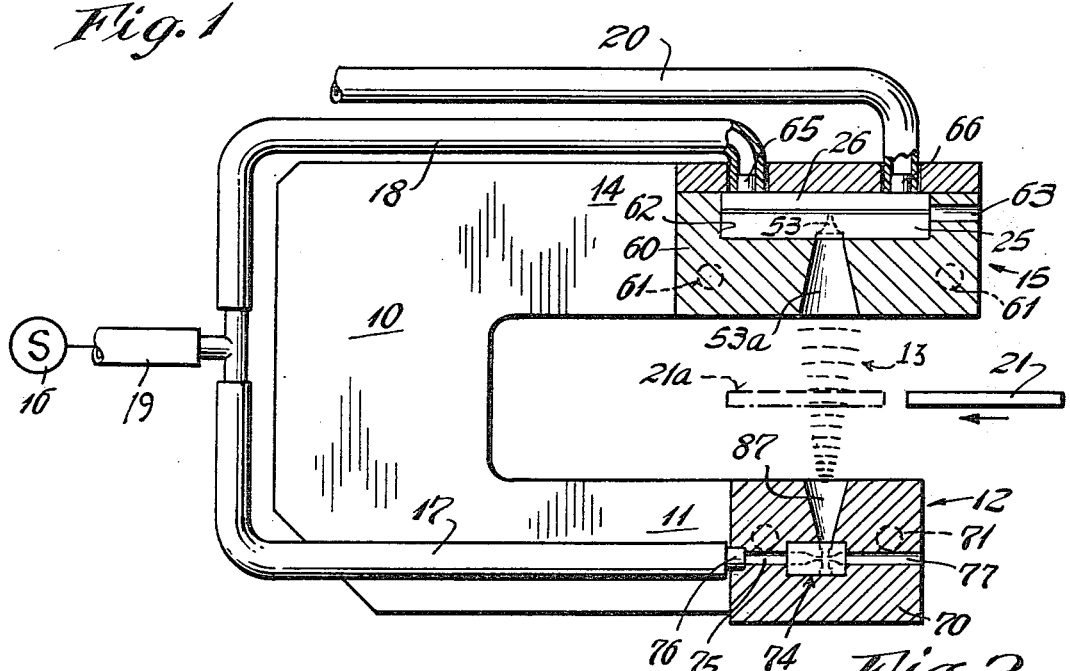
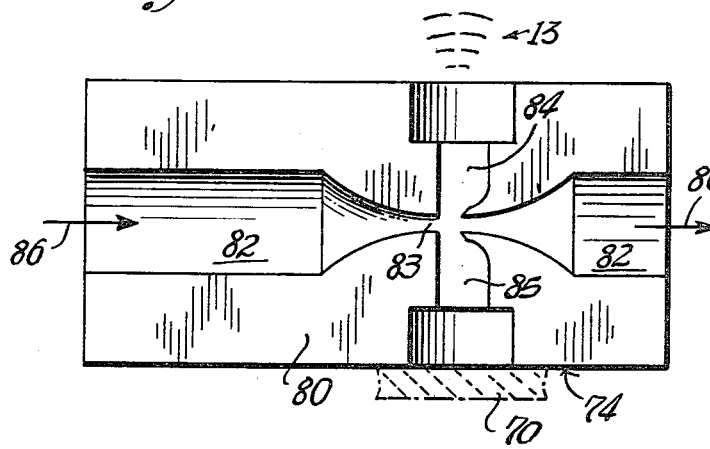
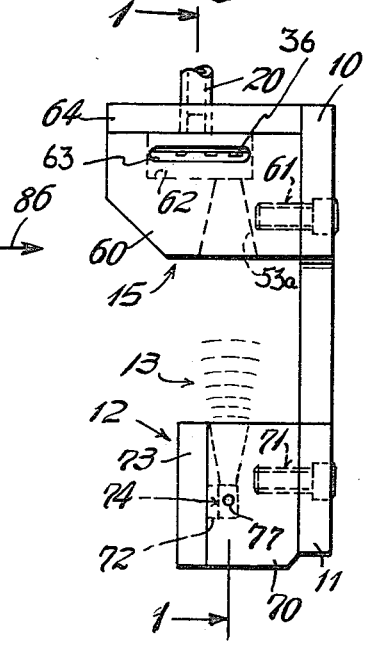
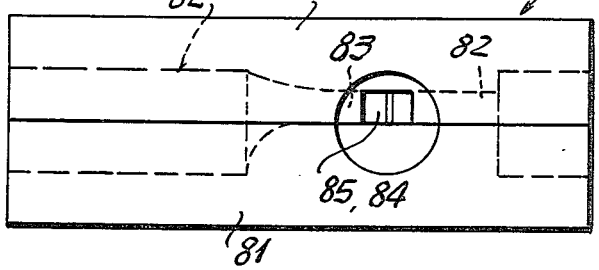
INVENTOR.
Basil B. Beeken
BY Albert W. Scribner
ATTORNEY

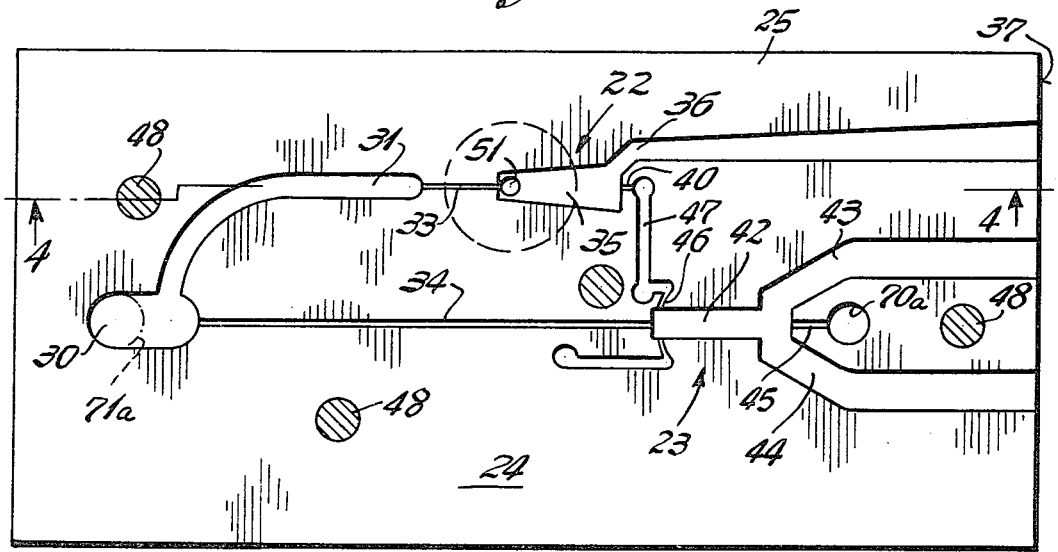
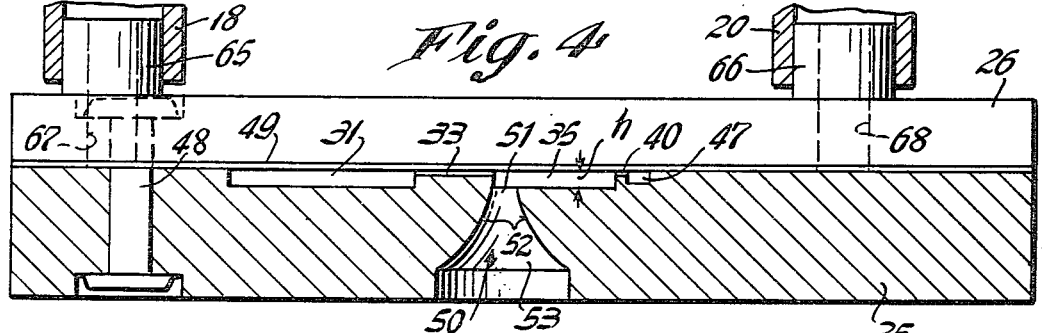
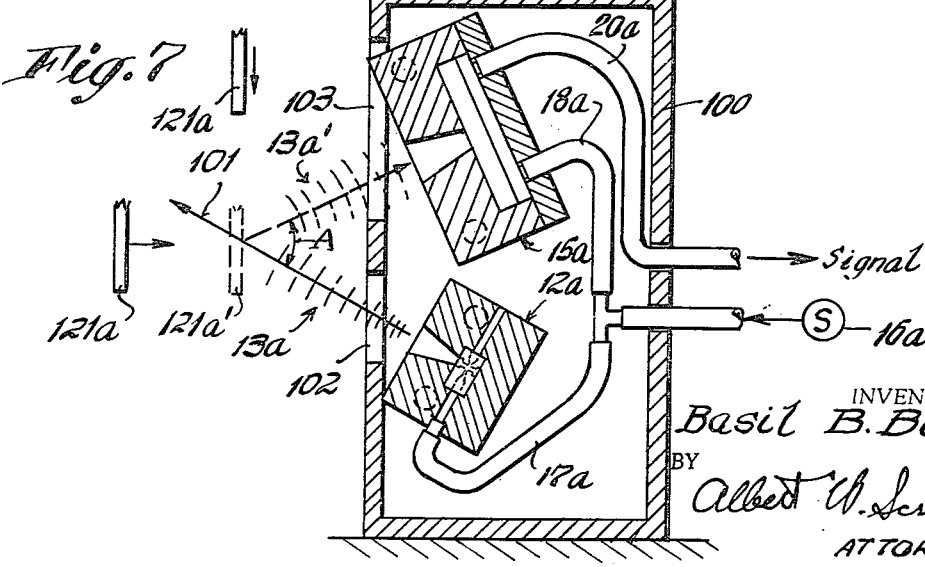
INVENTOR.
Basil B. Beeken
BY Albert W. Scribner
ATTORNEY United States Patent Office 3,500,952
Patented Mar. 17, 1970

3,500,952
ACOUSTICAL SENSING DEVICE
Basil B. Beeken, New Haven, Conn., assignor to Pitney-Bowes, Inc., Stamford, Conn., a corporation of Delaware
Filed Dec. 20, 1967, Ser. No. 692,152
Int. Cl. G01v 1/00; F15c 1/00
U.S. Cl. 181—.5                                    18 Claims

ABSTRACT OF THE DISCLOSURE

A sensing device having a sound wave generator that propagates an acoustical beam that is adapted to be impressed on an acoustically sensitive receiver. The sound wave generator comprised a novel whistle arrangement, while the receiver comprised a two stage fluidic unit that is operationally sensitive to the high sonic frequency of said acoustical beam. When an object to be sensed interrupts said acoustical beam the receiver initiates an output signal.

---

This invention relates to a novel sonic beam type sensing device. More particularly the invention relates to a novel sensing means having a fluid operated sound wave or acoustical beam generator that is operatively coupled with an improved acoustically sensitive receiver.

Several fluid type sensing devices have been proposed for detecting the presence of sheets, cards and other objects. These conventional devices usually employ a fluid jet that is directed so as to impinge on the object to be sensed and while this type of unit has several advantages there are some applications where due to environmental conditions and/or other reasons such fluid jet type systems are not entirely satisfactory.

The instant invention contemplates the use of an acoustical beam in a sensing system, the acoustical sensing beam here being capable of passing through a sensing station or region that might otherwise present hostile conditions to a corresponding sensing action of a fluid jet.

One object of the instant invention is to provide an improved means for generating and for detecting the existence of an acoustical sensing beam. Another object of the invention is to provide a practical acoustical sensing device that is not sensitive to the usual environmental sonic disturbances.

Another object of the invention is to provide a more efficient sensing system in which a relatively low powered fluid means may be reliably employed. Other objects of the invention will become apparent as the disclosure progresses.

In the drawings:

FIGURE 1 is a front elevational view in partial section and shows the relative orientation of the principal components of the instant sensing system.

FIGURE 2 is an end view of the apparatus illustrated in FIGURE 1.

FIGURE 3 is a detail plan view of the grooved circuit board comprising a portion of the instant acoustically sensitive receiver.

FIGURE 4 is a front elevational view in partial section and includes the apparatus shown in FIGURE 3, the grooved circuit board being shown in section as taken along section line 4—4 of FIGURE 3.

FIGURE 5 is a detail plan view of the grooved upper whistle plate illustrated in FIGURE 6.

FIGURE 6 is an elevational view of just the upper and lower plates of the instant whistle assembly.

FIGURE 7 is a vertical side elevational view in partial section and illustrates the orientation of the principal components of a modified form of the instant invention.

Referring to FIGURES 1 and 2 there is shown a sensing system comprising generally a main U-shaped frame 10 having mounted at the outer end of a lower extension 11 thereof a sound wave generator 12 that is adapted when operated to generate an acoustical beam 13. Mounted at the outer end of an upper frame extension 14 is a receiver 15 that is operationally sensitive to the acoustical beam 13. The generator 12 and receiver 15 are operatively coupled to a source 16 of fluid pressure through suitable conduit lines 17 and 18 respectively and a common line 19. A conduit line 20 is coupled to the signal output passage of the receiver 15. As will be more fully discussed below when an object 21 to be sensed moves to a dotted line position 21a shown in FIGURE 1 so as to intercept or to interfere with the acoustical beam 13 an output signal will be initiated in the output line 20.

The structural and functional characteristics of the two main components of the instant sensing device, i.e. the acoustical beam generator 12 and the receiver 15, will now be discussed in detail in connection with FIGURES 3–6. Considering first the receiver 15 of FIGURES 3 and 4, this component essentially comprises a two stage fluidic circuit that includes two fluid amplifiers 22 and 23. These two fluid amplifiers are formed by appropriately grooving the upper surface 24 of a main circuit board 25, this grooved surface then being covered and sealed by a suitable cover plate 26, FIGURE 4, as is well understood in the art. The specific fluidic circuit defined by said grooved surface is illustrated in FIGURE 3 and comprises a fluid supply inlet groove 30 that is formed in the board 25, which inlet groove communicates through a suitable groove 31 with the emitter groove or channel 33 of said fluid amplifier 22 and also communicates directly with the emitter groove or channel 34 of amplifier 23. Amplifier 22 includes a slightly diverging (as viewed in FIGURE 3) groove 35 that defines an interaction chamber, the upstream end of which communicates with said emitter channel 33 while the downstream end thereof communicates with an angularly extending venting channel 36 that extends longitudinally out through the end 37 of said circuit board 25. The downstream end of the interaction chamber also communicates with a collector groove or channel 40 that is coaxially aligned with said emitter groove 33. The amplifier 23 includes a widened groove 42 that defines an interaction chamber, the upstream end of which communicates with the emitter groove 34 while the downstream end thereof communicates with venting channels 43 and 44, the latter extending out through the said end 37 of circuit board 25. The down stream end of this interaction chamber also communicates with a collector groove or channel 45 that is coaxially aligned with said emitter groove 34. A control groove or channel 46 communicates at one end thereof with one side of the upstream end of said interaction chamber groove 42 while the other end thereof communicates with said collector groove 40 through a suitable channel 47.

As is illustrated in FIGURES 3 and 4 the depth $h$ in FIGURE 4 of the groove 31, said venting groove 36 and the interaction chamber groove 35 of amplifier 22 is considerably greater than that for the emitter groove 33 and collector groove 40 associated with this amplifier. In similar fashion the corresponding depth of groove 30, the interaction chamber groove 42 and venting channels 43, 44 of amplifier 23 is considerably greater than that for the emitter groove 34, control groove 46 and collector groove 45 associated with amplifier 23. The groove and channel configuration illustrated in FIGURE 3 is approximately to scale, the typical lengths for the interaction chamber grooves 35 and 42 each being in the order of five-sixteenths of an inch. One circuit board model has been constructed wherein the cross sectional size of the emitter groove 33 was made approximately .007 inch "wide" and .007 inch "deep" while the cross sectional size of the emitter groove 34 was made approximately .015 inch "wide" and .015 inch "deep." The cross sectional sizes of collector grooves 40 and 45 were substantially the same as those for said emitter grooves 33 and 34 respectively. The above noted dimensions represent only exemplary values and are not to be construed as being limiting values. When the cover plate 26 is sealingly secured to the circuit board 25, as by rivets 48 and gasket 49 or by other suitable means well known in the art, the various above described grooves and channels will have substantially rectangular cross sectional profiles.

Amplifier 22 is provided with a bell shaped control passage 50 which is formed through the circuit board 25 and which terminates at a port 51 disposed along one side of the upstream end of said interaction chamber groove 35. The side walls 52 defining the control passage 50 arcuately diverge so as to form an externally facing exponentially contoured (as seen in FIGURE 4) horn or sound wave receiving opening 53. The exponential horn 53 is operatively aligned with the generator 12 of the instant sensing apparatus as may be seen in FIGURE 1.

The circuit board assembly of FIGURE 4 is operatively retained on frame 10 by any suitable clamping or securing means such as a block 60: the latter here being fastened to the said frame by any suitable means such as screws 61 so that this assembly essentially defines the said receiver 15 illustrated in FIGURE 1. The upper portion of block 60 is provided with a recess 62, a venting opening 63 communicating with said recess 62, and a cover plate 64 (as may be best seen in FIGURE 2) to accommodate and hold the said circuit board assembly of FIGURE 4 in the desired fixed position on the frame 10. The lower portion of block 60 is formed with a tapered passageway 53a that communicates with recess 62 and is adapted to conduct any received portion of the acoustical beam 13 to the exponential horn 53. The cover plate 64, which is secured to the top of block 60 by any suitable fastening means, is formed with two appropriate apertures so that said fluid supply line 18 for said receiver 15 and the output line 20 from said receiver may respectively pass therethrough and be operatively coupled to the tubular fittings 65 and 66 that are integrally formed on the upper side of said cover plate 26; these fittings being provided with passages 67 and 68 which communicate with said supply groove 30 and said collector groove 45 respectively. The said passage 68 communicates with a recess 70a, FIGURE 3, formed in said upper surface 24 of the circuit board 25, said recess 70a also communicating with said collector groove 45 of amplifier 23. The passage 67 communicates with fluid supply groove 30 as is diagrammatically indicated by the dotted line 71a of FIGURE 3.

Each of the amplifiers 22 and 23 is mono-stable in operation. The normal mode of operation of each amplifier is such that a laminar jet of fluid exists between the emitter and collector thereof whereby the pressure in said collector will be relatively high. When a suitable signal is applied to the amplifier the fluid flow in the laminar jet will become turbulent and this turbulent flow will for the most part exhaust through the associated amplifier vent grooves leaving the pressure in the collector relatively low. This turbulent mode of operation will continue until the said signal is removed whereupon the amplifier will immediately resume operating in said normal laminar mode.

The operation of the circuit board assembly of FIGURES 3 and 4 is as follows: assuming the fluid supply line 18, FIGURE 1, is operatively coupled to the supply inlet passage 30 fluid, such as air, from the pressure source 16 flows through both emitter channels 33 and 34 so that at the downstream end of each of said emitters there issues a laminar jet of fluid which is normally directed into the associated collector groove 40 or 45. The resultant higher fluid pressures in the collector groove 40 of amplifier 22, however, produces a control signal or fluid flow which passes through the control groove 46 of amplifier 23 to thereby cause the latter to assume a turbulent mode of operation. Here then with no effective portion of the acoustical beam 13 reaching the control port 50 of the small amplifier 22 the state of operation of the circuit is such that amplifier 22 remains in its laminar mode while amplifier 23 remains in its turbulent mode operation. Under these conditions the pressure in the collector 45 of amplifier 23 will be relatively low and, with the collector 45 operatively connected through passages 70 and 68 to the receiver output line 20, said low pressure condition will also exist in said output line 20. When an effective portion of said acoustical beam 13, FIGURE 1, is received through the exponential horn 53 and impinges on said laminar jet issuing from emitter groove 33 the small amplifier 22 will be thereby switched to its turbulent mode wherein the flow in said laminar jet becomes turbulent and exhausts through said venting channel 36. The resulting pressure drop in collector 40 and the control groove 46 will cause amplifier 23 to switch to its laminar mode whereby the pressure in collector 45 and said output line 20 will become relatively high. Upon said effective portion of the acoustical signal being terminated or removed from the said amplifier control passage 50 the amplifiers 22 and 23 will immediately revert to their previously described laminar and turbulent modes respectively.

The means 12 for generating the acoustical beam 13, FIGURE 1, will now be generally described in connection with FIGURES 1, 2, 5, and 6. The sound wave generator 12 assembly includes a block 70, FIGURE 1, that is secured to the lower extension 11 of frame 10 by any suitable means such as screws 71. The outer face, as seen in FIGURE 2, of block 70 is formed with a recess 72 and is covered with a cover plate 73, FIGURE 2, so as to clamp a whistle 74 therein in a desired fixed position relative to the other components of the instant sensing apparatus. The block 70 is also formed with a passage 75, FIGURE 1, to permit any suitable connection 76 to be made between the whistle and the said fluid supply line 17, and with another passage 77 to accommodate the exhaust flow from said whistle. The whistle 74 per se is shown in FIGURES 5 and 6 and generally comprises a pair of laminated plates 80 and 81 whose mutually contacting surfaces are conjointly formed or grooved so as to cooperatively define a longitudinal passage 82 having a restriction 83 therein which communicates with transverse passages 84 and 85. The shapes and mutual orientation of these passages 83, 84, and 85 cooperatively define a whistle or sound wave generating arrangement that is more fully described and discussed in my copending patent application Ser. No. 589,426 filed Oct. 25, 1966, now U.S. Patent 3,432,804. If desired detailed information concerning the whistle may be obtained by reviewing said copending application; suffice it to say here that when fluid flows through passages 82 and 83 as indicated by arrows 86, FIGURE 5, sound waves or an acoustical beam 13 will be initiated in one (84 here) of said lateral passages 84, 85 if the other passage (85 here) is blocked off as is illustrated in FIGURES 1 and 5. As may be seen in FIGURES 1 and 2 the whistle retaining block 70 is formed with a conical opening 87 to allow the acoustical beam 13 generated by whistle 74 to be directed towards said passage 53a and the exponential horn 53 of said receiver 15. The sonic frequency of the acoustical beam 13 generated by whistle 74 should be within the range of frequency to which the fluid amplifier 22 is sensitive as will be more fully discussed below.

The overall operation of the instant sensing device will now be described in connection with FIGURE 1. Pressure fluid such as air is supplied from source 16 through lines 17, 18, and 19 to both the sonic generator 12 and the acoustically sensitive receiver 15, and under these conditions the whistle 74 will function to generate said acoustical beam 13 and the passage 87 will direct said beam towards said receiver 15. An effective portion of this beam will normally enter the receiver passage 53a, horn 53 and control passage 50 of said amplifier 22 and such will cause the laminar jet from emitter groove 33 to become turbulent and the fluid pressure in the collector 45 of amplifier 23 (and thus in the output line 20 of the receiver 15) to remain relatively high as above discussed. This normal condition of the sensing device will persist until an object 21 to be sensed is moved into interfering relation or in a position 21a with respect to said beam 13 at which time no effective portion of the beam 13 impinges on the side of the laminar jet of said amplifier 22 whereupon the fluid pressure in the output line 20 will drop as above discussed. This drop in pressure in the output line 20 will constitute an output signal indicating the sensed presence of the said object 21. When object 21 is subsequently removed an effective portion of the acoustical beam 13 will again reach the exponential horn 53 of amplifier 22 thus causing the fluid pressure in the said output line 20 to be restored to its normal relatively high level.

The instant sensing device has been found to perform very reliably over long periods of use particularly where the whistle 74 is constructed so as to generate high non-audible sonic frequencies, i.e. above 20,000 cycles per second. A 50 kilocycle frequency has been found to be particularly reliable and practical. As above mentioned the amplifier 22 is constructed and arranged so as to be operationally sensitive to the sonic frequency of beam 13. By using these relatively high sonic frequencies substantially all of the random or other background "noises" in the general area of the instant sensing device will be effectively eliminated as a source of a possible inadvertant signal which could cause either amplifier 22 or 23 to switch from a laminar to a turbulent mode of operation. To be sensitive only to these relatively high sonic frequencies the amplifier 22 must be small; i.e. the jet of air issuing from the emitter groove 33 must have a cross sectional area less than .0001 square inch while using a fluid source pressure of less than two pounds per square inch. With such low powered fluid jets the power output from amplifier 22 would not be compatible with practical fluidic power levels so the output of amplifier 22 is coupled, as shown and described in connection with FIGURES 3 and 4, with the amplifier 23.

A modified form of the invention is illustrated in FIGURE 7. Here a sonic generator 12a similar to the previously described generator 12, and a sonically sensitive receiver 15a similar to the previously described receiver 15, are fixedly mounted by any suitable means in a box-like frame 100; the operative portions of said units 12a and 15a being respectively exposed to the adjacent sensing region through suitable apertures 102 and 103 formed through said box-like frame 100. Said units 12a and 15a are mounted so that their operational axes intersect at an angle A. The units 12a and 15a are positionally adjusted by any suitable adjustable mounts so that their said axes intersect at the desired distance from said frame 100. The sonic generator 12a is adapted to generate an acoustical beam 13a which is directed generally along an axis 101 in a manner similar to that described in connection with FIGURES 1–6 while the receiver 15a is arranged to receive a reflected portion 13a of the said beam 13a. In the arrangement of FIGURE 7 the acoustical beam 13a is not initially directed towards the receiver 15a as in the embodiment of FIGURES 1–6 above, rather no effective portion of said beam 13a reaches the receiver 15a and thus a relatively low fluid pressure will normally exist in the output line 20a of receiver 15a. When an object 121a to be sensed is moved to a region illustrated by the dotted line 121a the acoustical beam 13a will impinge on said object and will be at least partially reflected off as indicated in FIGURE 7 so that at least a portion of this redirected acoustical beam 13a' enters the receiver 15a and, in the manner above described, will cause the latter to initiate an output signal in the output line 20a of the apparatus which output signal in this arrangement is represented by a fluid pressure rise in said line 20a. When the object 121a is removed from the proximity of said region the fluid pressure in said line 20a will drop to its said normal relatively low level. The sensing system of FIGURE 7 is capable of being located on one side of the object to be sensed and operates much in the nature of a "proximity" sensing device, i.e. any presence of said object 121a in the general region of the device will cause said receiver 15a to initiate said output signal.

What is claimed is:

1. An acoustically operating sensing device: comprising
    a frame;
    a sonic generator mounted on said frame and adapted to generate an acoustical beam having a frequency in excess of 20 kilocycles per second;
    a receiver mounted on said frame in spaced relation with respect to said generator and being operationally sensitive to said acoustical beam;
    said sonic generator including a whistle that is formed with a sound wave directing passage;
    said receiver including a fluidic circuit comprising a first relatively low powered fluid amplifier and a second relatively high powered fluid amplifier;
    said first fluid amplifier having an emitter that is adapted to direct a laminar jet of fluid toward a collector associated therewith;
    said receiver being formed with an exponential horn that defines a sonic wave receiving passage that terminates at a small port laterally adjacent the downstream end of said emitter whereby said laminar jet of fluid is thereby exposed so as to be capable of being controlled by said acoustical beam;
    said second fluid amplifier including an emitter that is adapted to direct a laminar jet of fluid towards a collector associated therewith, the first mentioned collector being connected so as to control the operation of said second fluid amplifier while the second mentioned collector is connected to an output line for said sensing device, and
    means for conducting pressure fluid simultaneously to said whistle and both of said emitters.

2. Apparatus as defined by claim 1 wherein the effective axis of sound wave directing whistle passage is substantially aligned with said small control port of said first fluid amplifier.

3. Apparatus as defined by claim 1 wherein said whistle and receiver are disposed on the same side of the object to be sensed so that said small control port of said first fluid amplifier is adapted to receive a portion of the acoustical beam that is reflected from said object to be sensed and to thereby cause said second fluid amplifier to initiate an output signal.

4. Apparatus as defined by claim 1 wherein the effective cross sectional are of the said emitter of said first fluid amplifier is less than .0001 square inch.

5. An acoustically sensitive fluidic device: comprising a turbulence type amplifier having an elongated emitter channel, a collector channel aligned with said emitter channel, and a substantially closed interaction chamber disposed between and communicating at the ends thereof with said channels respectively, the width of said interaction chamber at a point adjacent the downstream end of said emitter channel being substantially wider than said adjacent end of said emitter channel;
    said interaction chamber being provided with a port adjacent the said downstream end of said emitter channel; and conduit means defining a passage that terminates at said port for conducting acoustical signals to said port and said interaction chamber whereby a laminar flow condition in the fluid issuing from said emitter may be switched to a turbulent fluid flow condition.

6. Apparatus as defined by claim 5 wherein said conduit means are formed so that the axial sectional profile of said passage has a substantially exponential contour so as to focus acoustical signals towards said port.

7. Apparatus as defined by claim 6 wherein said emitter channel has an effective cross sectional area of less than .0001 square inch so as to be sensitive to frequencies above 20,000 cycles per second.

8. Apparatus as defined by claim 7 wherein said device is structurally defined by a composite assembly of a lower grooved board and an upper sealing plate, the said lower board containing grooves which effectively define both said amplifier and said conduit means.

9. Apparatus as defined by claim 5: additionally comprising a second turbulence type amplifier controlled by the first mentioned turbulence type amplifier;
said first mentioned turbulence type amplifier being acoustically sensitive only to acoustical signals having frequencies above 20,000 cycles per second.

10. An all pneumatic sensing system: comprising
whistle means;
pneumatic means for operating said whistle means;
a fluid jet means spaced from said whistle means; said fluid jet means being sensitive to the sonic waves generated by said whistle means;
conduit means for directing the sonic waves generated by said whistle means in a predetermined direction; and
pneumatic means for operating said fluid jet means, said fluid jet means being controlled by the presence or absence of an object that either interferes with progression of said sonic waves in said direction or produces reflection of said sonic waves.

11. Apparatus as defined by claim 10 wherein said fluid jet means includes a primary fluid jet means that is sensitive to the sonic waves generated by said whistle means, and a secondary fluid jet means that is adapted to be controlled by said primary fluid jet means.

12. Apparatus as defined by claim 10 wherein said whistle means and said fluid jet means are relatively positioned and supported so that the object to be sensed moves between said whistle means and jet means so as to intercept said sonic waves.

13. Apparatus as defined by claim 10 wherein said whistle means and said fluid means are relatively positioned and supported so that at least an effective portion of the sonic waves generated by said whistle means reach said fluid jet means by being reflected off the object being sensed.

14. Apparatus as defined by claim 13 wherein said fluid jet means includes a primary fluid jet means that is sensitive to the sonic waves generated by said whistle means, and a secondary fluid jet means that is controlled by said primary fluid jet means.

15. Apparatus as defined by claim 10 wherein said fluid jet means includes a turbulence type amplifier that is sensitive to said sonic waves, and wherein said conduit means includes a conduit which is adapted to focus at least a portion of said sonic waves on said jet means.

16. A sensing system: comprising
a sonic wave generating means;
a sonically sensitive means adapted to be controlled by the sonic waves from said generating means;
passage means adapted to direct at least a portion of sonic waves emitted by said generating means towards said sonically sensitive means; and
mounting means for relatively supporting said wave generating means and said sonically sensitive means so that an effective portion of the sonic waves from said generating means may reach said sonically sensitive means by being reflected off an object being sensed.

17. Apparatus as defined by claim 16 wherein said generating means includes a whistle.

18. Apparatus as defined by claim 16 wherein said sonically sensitive means includes a fluid jet means, and wherein said passage means includes a sonic wave conducting passage that terminates adjacent said fluid jet means.

References Cited
UNITED STATES PATENTS

| | | | |
|---|---|---|---|
| 2,571,640 | 10/1951 | Willman. | |
| 2,907,337 | 10/1959 | Bemporad. | |
| 3,225,988 | 12/1965 | Drenning | 226—45 X |
| 3,234,955 | 2/1966 | Auger | 137—81.5 |
| 3,243,993 | 4/1966 | Jacobsen | 73—37.7 |
| 3,285,608 | 11/1966 | Lyman | 226—45 X |
| 3,342,284 | 9/1967 | Baird. | |
| 3,389,679 | 6/1968 | Weber et al. | 137—81.5 X |

BENJAMIN A. BORCHELT, Primary Examiner

T. H. WEBB, Assistant Examiner

U.S. Cl. X.R.
137—81.5